(12) United States Patent
Gasparik

(10) Patent No.: US 6,483,879 B1
(45) Date of Patent: Nov. 19, 2002

(54) COMPENSATING FOR INITIAL SIGNAL INTERFERENCE EXHIBITED BY DIFFERENTIAL TRANSMISSION LINES

(75) Inventor: Frank Gasparik, Monument, CO (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/385,588

(22) Filed: Aug. 27, 1999

(51) Int. Cl.$^7$ .................................................. H04B 3/00
(52) U.S. Cl. ......................................................... 375/257
(58) Field of Search ................................. 375/257, 286; 710/305

(56) References Cited

U.S. PATENT DOCUMENTS

| | | |
|---|---|---|
| 4,498,021 A | 2/1985 | Uya |
| 4,608,530 A | 8/1986 | Bacrania |
| 4,829,199 A | 5/1989 | Prater |
| 4,855,623 A | 8/1989 | Flaherty |
| 5,157,282 A | 10/1992 | Ong et al. |
| 5,255,222 A | 10/1993 | Eaton, Jr. |
| 5,287,386 A | 2/1994 | Wade et al. |
| 5,319,258 A | 6/1994 | Ruetz |
| 5,352,939 A | 10/1994 | Hirabayahsi et al. |
| 5,418,478 A | 5/1995 | Van Brunt et al. |
| 5,495,186 A | 2/1996 | Kanazawa et al. |
| 5,522,081 A | 5/1996 | Carls |
| 5,568,068 A | 10/1996 | Ota et al. |
| 5,632,019 A | 5/1997 | Masiewicz |
| 5,654,981 A | 8/1997 | Mahant-Shetti et al. |
| 5,656,952 A | 8/1997 | McCall et al. |
| 5,663,664 A | 9/1997 | Schnizlein |
| 5,719,509 A | 2/1998 | Chan |
| 5,732,027 A | 3/1998 | Arcoleo et al. |
| 5,771,285 A * | 6/1998 | Wittman ...................... 379/377 |
| 5,778,204 A * | 7/1998 | Van Brunt et al. .......... 170/305 |
| 5,834,955 A | 11/1998 | Eichfeld et al. |

* cited by examiner

Primary Examiner—Chi Pham
Assistant Examiner—Kevin M Burd
(74) Attorney, Agent, or Firm—Maginot, Moore & Bowman, LLP

(57) ABSTRACT

A method of compensating for initial signal interference exhibited by a differential transmission line includes the step of determining whether the differential transmission line has been at a first differential voltage state for at least a first predetermined time period. The method also includes the step of transmitting a first data bit across the differential transmission line by impressing a first differential voltage having a first magnitude upon the differential voltage line in order to drive the differential transmission line from the first differential voltage state to a second differential voltage state if the determining step determines that the differential transmission line has not been at the first differential voltage state for at least the first predetermined time period. Another step of the method includes transmitting the first data bit upon the differential transmission line by impressing upon the differential voltage line a second differential voltage having a second magnitude larger than the first magnitude in order to drive the differential transmission line from the first differential voltage state to a second differential voltage state if the determining step determines that the differential transmission line has been at the first differential voltage state for at least the first predetermined time period. Apparatus for compensating for initial signal interference exhibited by a differential transmission line are also disclosed.

20 Claims, 5 Drawing Sheets

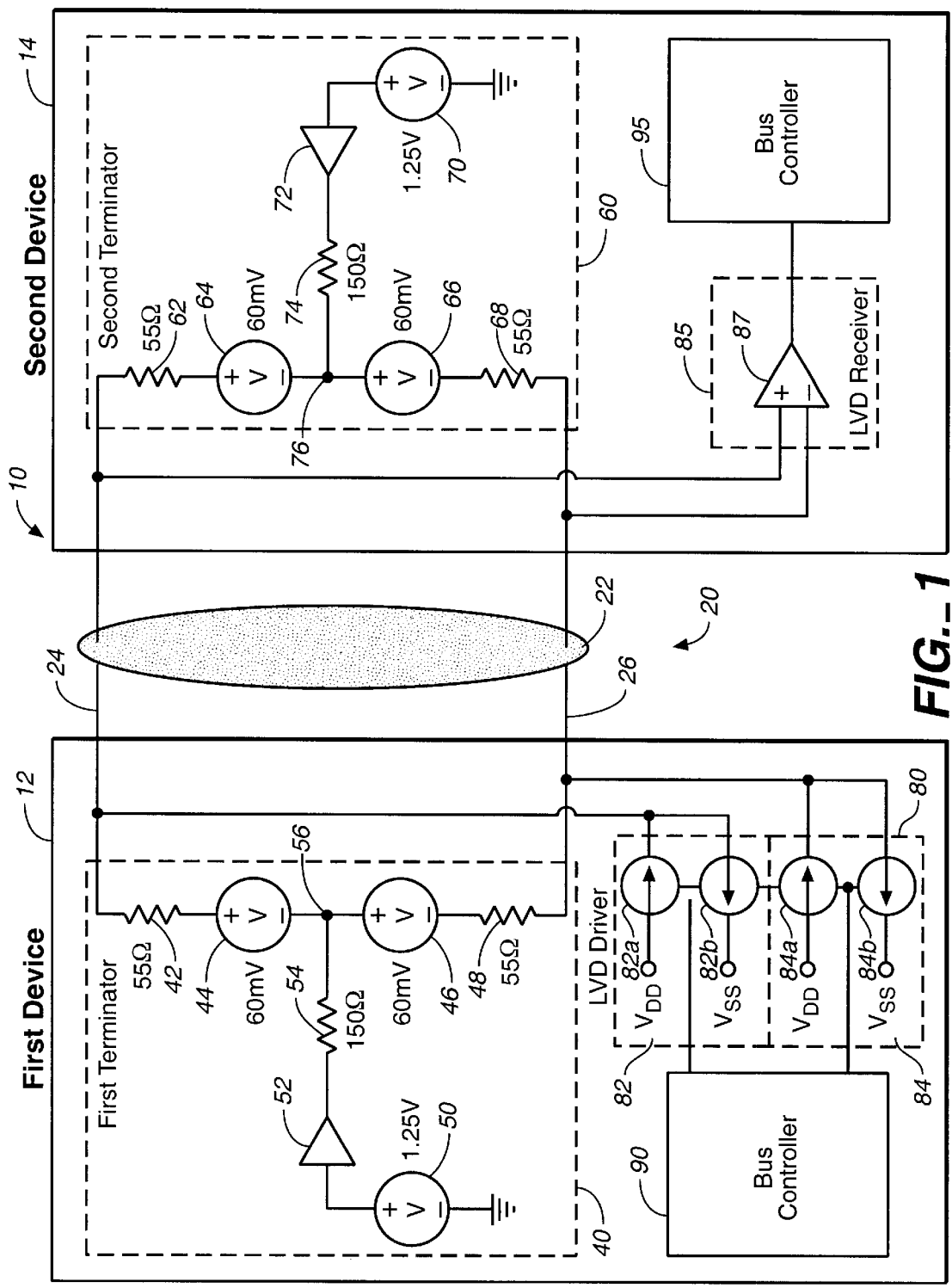
FIG._1

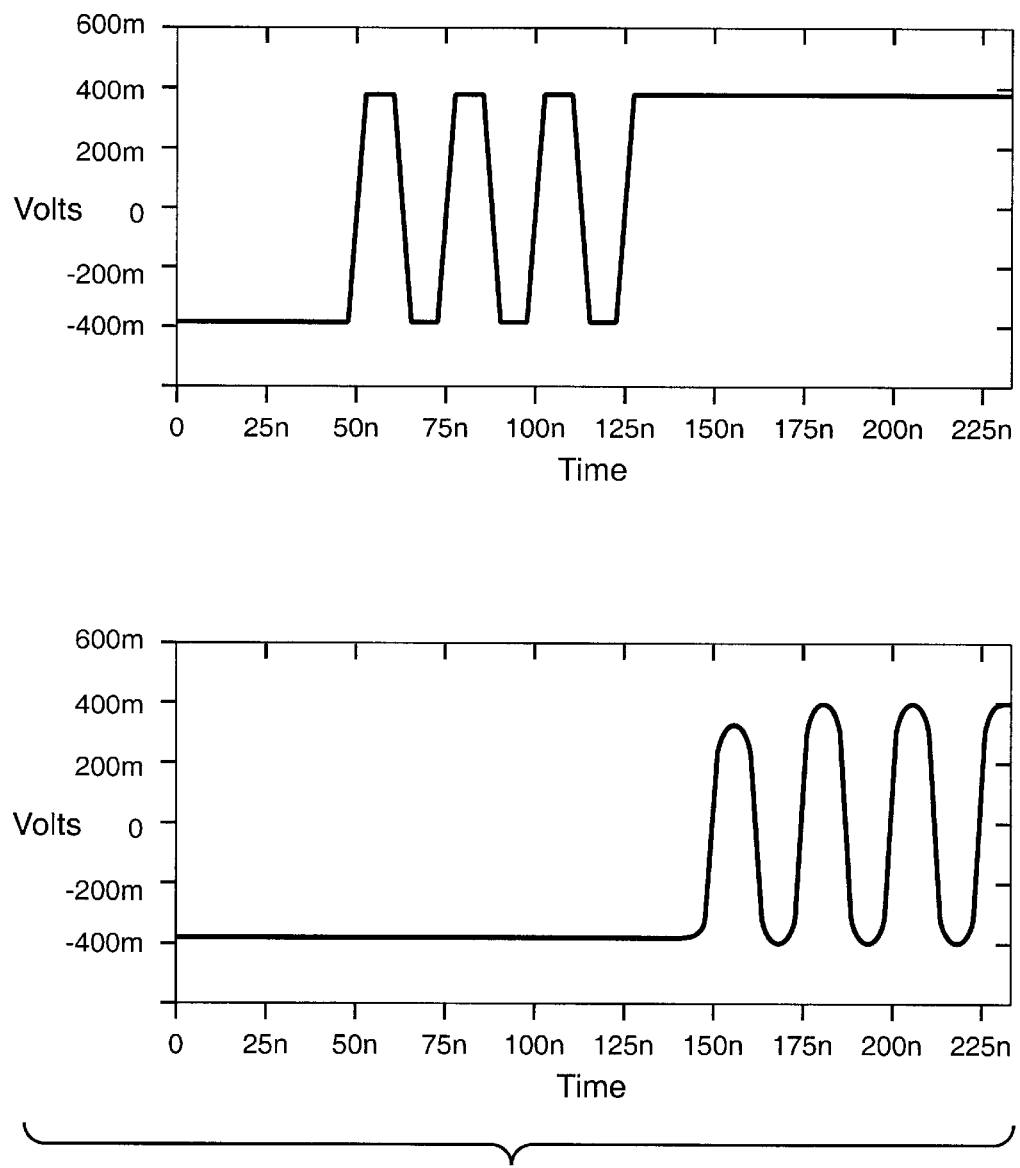
FIG._2

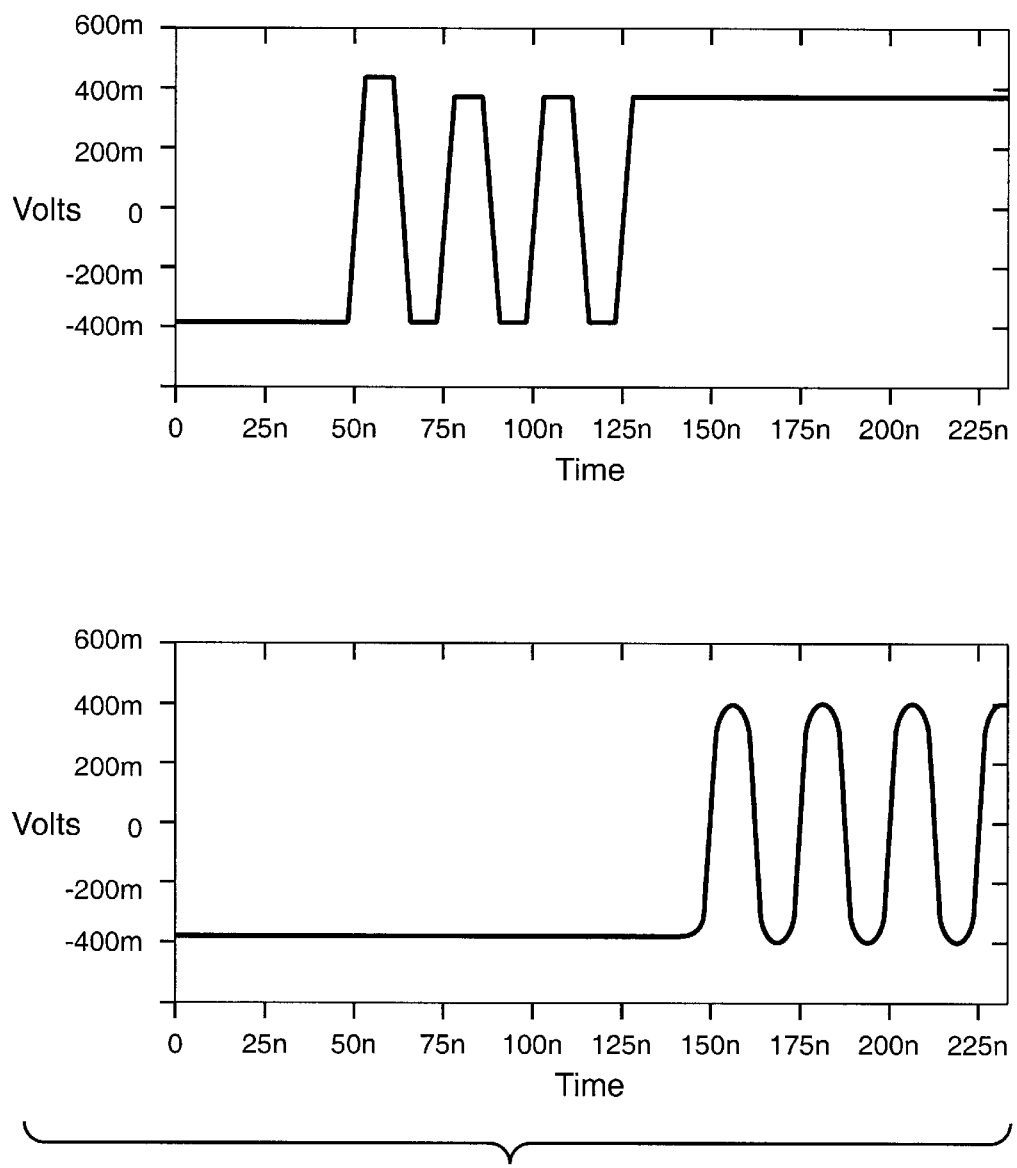
FIG._3

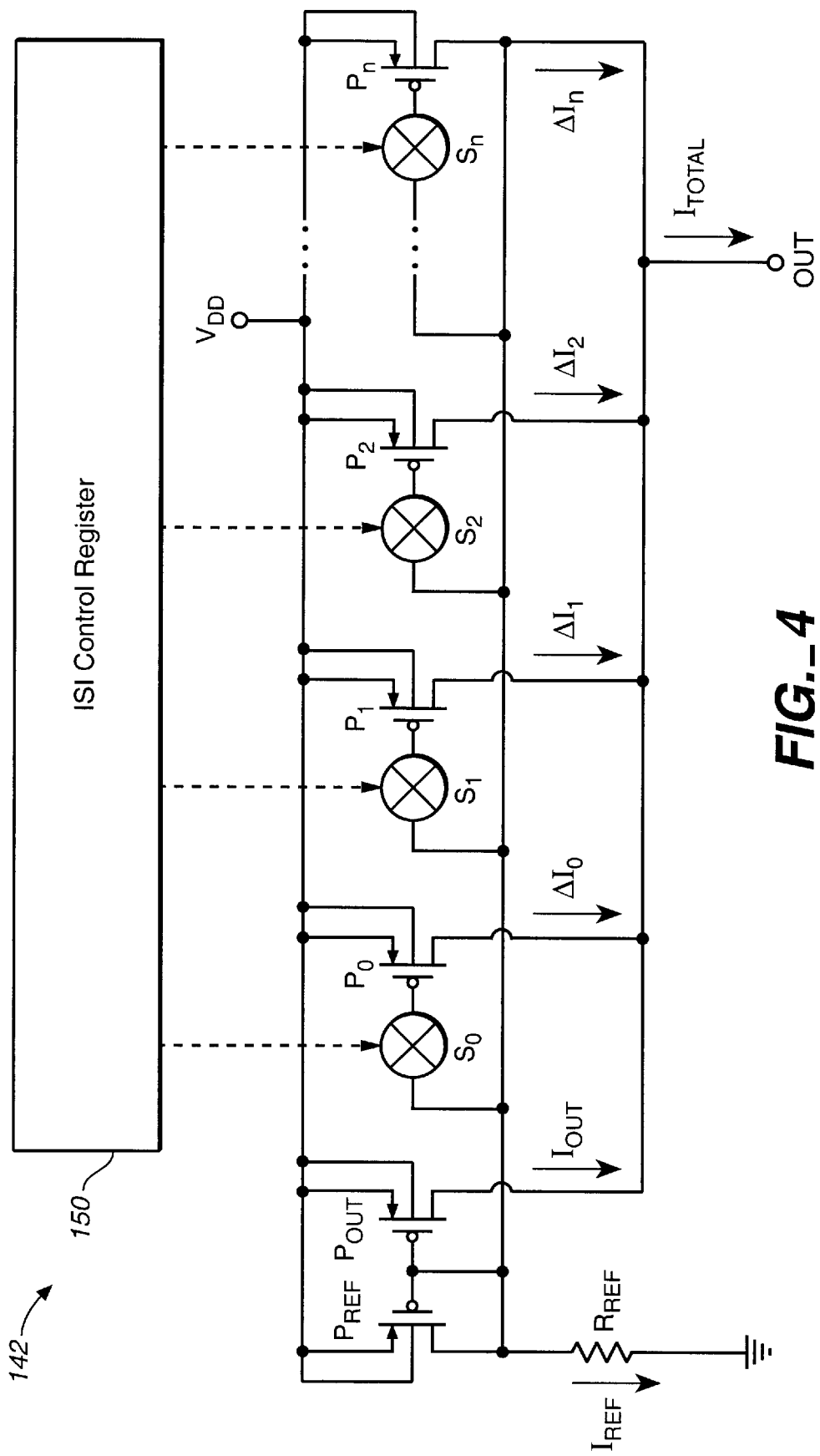
FIG._4

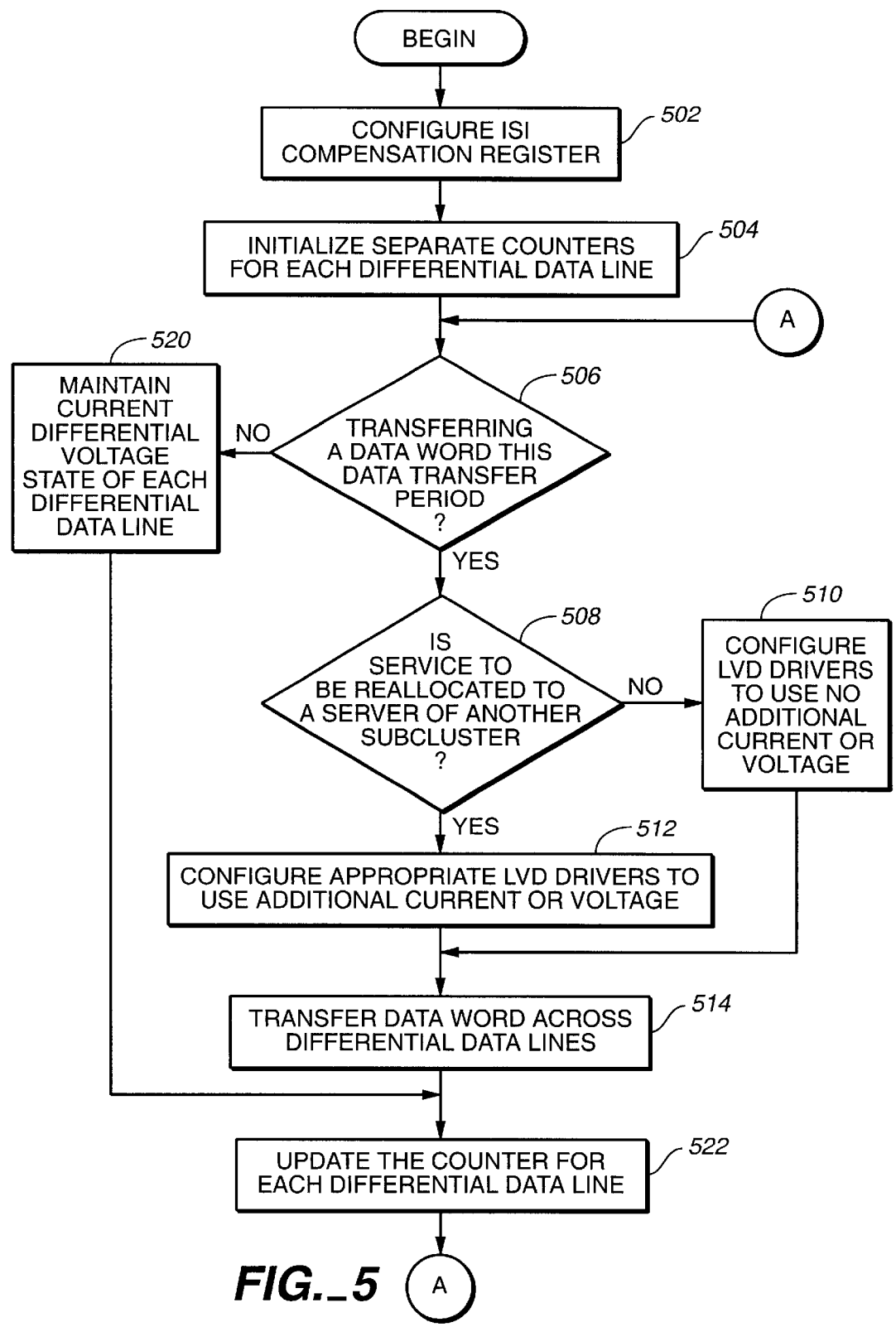
FIG._5

COMPENSATING FOR INITIAL SIGNAL INTERFERENCE EXHIBITED BY DIFFERENTIAL TRANSMISSION LINES

BACKGROUND OF THE INVENTION

The present invention relates generally to data transmission, and more particularly to a method and apparatus for compensating for initial signal interference exhibited by differential transmission lines.

A computer bus is generally a set of parallel conductors or transmission lines interconnecting two or more electrical devices for the purpose of data transfer. The SCSI bus is one popular type of interconnect bus designed for short distant data communication between computers and peripheral devices. In particular, the SCSI bus has been designed to interconnect independent devices such as disk drives, tape drives, scanners, and computers. Several SCSI versions have been developed and standardized, with newer versions being developed to keep pace with changing computer speeds and requirements. One of the newer standards is low voltage differential (LVD) SCSI, an improved version of differential SCSI.

LVD SCSI transfers data via low differential voltage signals (e.g. ±400 mV differences) which enable higher data transfer rates and longer data transfer distances than the older single-ended SCSI standards. More specifically, an LVD SCSI bus includes several differential bus line each comprising two separate bus lines or transmission lines. In general, LVD controllers transmit a binary zero over a differential bus line of the LVD SCSI bus by developing a positive voltage difference between a first bus line and a second bus line of the differential bus line. Similarly, LVD controllers transmit a binary one over a differential bus of a LVD SCSI bus by developing a possitive voltage difference between the first bus line and the second bus line of the differential bus line.

Generally, LVD SCSI bus controllers utilize either current mode LVD drivers or voltage mode LVD drivers to develop the differential voltages between the bus lines of the differential bus lines. More specifically, known LVD SCSI bus controllers with current mode LVD drivers have always transmitted binary zeros by driving the differential bus line with a first current having a first magnitude and have always transmitted binary ones by driving the differential bus line with a second current having a second magnitude. Similarly, known LVD SCSI bus controllers having voltage mode LVD drivers have always transmitted binary zeros by driving the differential bus line with a first voltage having a first magnitude, and have always transmitted binary ones by driving the differential bus line with a second voltage having a second magnitude.

While at slower transfer speeds these known LVD SCSI controllers were able to transfer data across differential bus lines without significant data loss, it has been found that significant data loss now occurs when using these known LVD drivers at the faster transfer speeds such as transfer speeds dictated by the Fast40 and Fast80 SCSI protocols. The inventor has found the reason that significant data loss occurs using the known LVD SCSI controllers is that differential voltage developed upon a differential bus line by the LVD drivers of the known LVD SCSI controllers has a diminished magnitude at the receiving devices when data is transferred across the differential bus line after the differential bus line has been at an opposite differential voltage state for a precharge time period. As a result of failing to develop a differential voltage having a sufficient magnitude at the receiving device, LVD receivers of the receiving device commonly failed to accurately receive at least the first data bit and possible more data bits following the differential data line being at the opposite differential voltage for a precharge time period.

For example, a known LVD SCSI controller may consecutively transfer a series of binary zeros across a differential bus line by driving the differential bus line to a first differential voltage state (e.g. ±400 mV) for each binary zero of the series. Then, the LVD SCSI controller may transfer a series of binary ones across the differential bus line by driving the differential bus line to a second differential voltage state (e.g. −400 mV). At slower transfer rates, LVD receivers accurately received the series of binary zeroes and the series of binary ones. However, at faster transfer rates, the LVD receivers often inaccurately received the first binary one of the series of ones at higher transfer speeds due to the differential voltage developed at the LVD receiver for the first binary one having a diminished magnitude (e.g. −300 mV). The above phenomena of a diminished differential amplitude being developed at the LVD receiver is referred to herein as initial signal interference (ISI).

A need therefore exists for a method and apparatus that compensate for initial signal interface exhibited by differential transmission lines in order to enable reliable data transfers at high transfer rates across differential transmission lines.

SUMMARY OF THE INVENTION

In accordance with one embodiment of the present invention, there is provided a method of compensating for initial signal interference exhibited by a differential transmission line. One step of the method includes determining whether the differential transmission line has been at a first differential voltage state for at least a first predetermined time period. Another step of the method includes transmitting a first data bit across the differential transmission line by driving the differential transmission line from the first differential voltage state to a second differential voltage state with a first current having a first magnitude if the determining step determines that the differential transmission line has not been at the first differential voltage state for at least the first predetermined time period. Yet another step of the method includes transmitting the first data bit upon the differential transmission line by driving the differential transmission line from the first differential voltage state to the second differential voltage state with a second current having a second magnitude that is larger than the first magnitude if the determining step determines that the differential transmission line has been at the first differential voltage state for at least the first predetermined time period.

Pursuant to another embodiment of the present invention, there is provided a method of compensating for initial signal interference exhibited by a differential transmission line. The method includes the step of determining whether the differential transmission line has been at a first differential voltage state for at least a first predetermined time period. The method also includes the step of transmitting a first data bit across the differential transmission line by impressing a first differential voltage having a first magnitude upon the differential voltage line in order to drive the differential transmission line from the first differential voltage state to a second differential voltage state if the determining step determines that the differential transmission line has not been at the first differential voltage state for at least the first predetermined time period. Another step of the method includes transmitting the first data bit upon the differential transmission line by impressing upon the differential voltage line a second differential voltage having a second magnitude larger than the first magnitude in order to drive the differential transmission line from the first differential voltage state to a second differential voltage state if the determining step determines that the differential transmission line has been at the first differential voltage state for at least the first predetermined time period.

Pursuant to another embodiment of the present invention, there is provided a differential bus controller that compensates for initial signal interface associated with data transfers across a differential bus comprising differential bus lines. The differential bus controller includes a controller and differential drivers. The controller is coupled to the differential bus lines and is operable to control data transfers across the differential bus. The controller is also operable to separately determine for each differential bus line whether the differential bus line has been at a first differential voltage state for at least a first predetermined time period. Moreover, the controller is operable to generate a separate control signal for each differential bus line which indicates whether the differential bus line has been at the first differential voltage state for at least the first predetermined time period.

The differential drivers of the differential bus controller are coupled to the differential bus lines. Each differential driver is operable to transmit a first data bit across the differential bus line by driving the differential voltage line from the first differential voltage state to a second differential voltage state with a first current having a first magnitude if the control signal generated by the controller for the respective differential bus line indicates that the respective differential bus line has not been at the first differential voltage state for at least the first predetermined time period. Moreover, each differential driver is operable to transmit the first data bit across the differential bus line by driving the differential voltage line from the first differential voltage state to the second differential voltage state with a second current having a second magnitude that is greater than the first magnitude if the control signal generated by the controller for the respective differential bus line indicates that the respective differential bus line has been at the first differential voltage state for at least the first predetermined time period.

It is an object of the present invention to provide an improved method and apparatus for transferring data across a differential transmission line.

It is also an object of the present invention to provide a new and useful method and apparatus for transferring data across a differential transmission line.

It is another object of the present invention to provide a method and apparatus for increasing the reliability of data transfers across a differential transmission line.

It is yet another object of the present invention to provide a method and apparatus for compensating for initial signal interference exhibited by differential transmission lines during data transfers.

The above and other objects, features, and advantages of the present invention will become apparent from the following description and the attached drawings.

BRIEF DESCRIPTION OF THE DRAWINGS

FIG. 1 shows a schematic diagram of a SCSI bus configuration that incorporates various features of the present invention therein;

FIG. 2 shows a signal diagram that illustrates the effects of initial signal interference (ISI) upon the SCSI bus configuration of FIG. 1;

FIG. 3 shows a signal diagram that illustrates the effect of the ISI compensation of the present invention upon the SCSI bus configuration of FIG. 1;

FIG. 4 shows a schematic diagram of a programmable current source suitable for implementing the LVD driver of FIG. 1; and FIG. 5 shows a flowchart that illustrates use of ISI compensation during the operation of the SCSI bus configuration of FIG. 1.

DETAILED DESCRIPTION OF A PREFERRED EMBODIMENT

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a simplified schematic diagram of a low voltage differential (LVD) SCSI bus configuration 10 which incorporates features of the present invention therein. The LVD SCSI bus configuration 10 includes a first SCSI device 12, a second SCSI device 14, and a SCSI bus 20 that couples the first SCSI device 12 to the second SCSI device 14. The first SCSI device 12 and the second SCSI device 14 may be computer systems, network servers, printers, hard drives, CD-ROM drives, RAID devices, or any other peripheral device having a LVD SCSI interface.

The SCSI bus 20 provides a communications path between the first device 12, the second device 14, and any other SCSI device that may be coupled to the SCSI bus 20. To this end, the SCSI bus 20 includes several control lines and data lines that are utilized for transferring data between devices coupled to the SCSI bus 20. Typically, each data line of the SCSI bus 20 is terminated and controlled in a similar manner. Therefore, in order to simplify FIG. 1, only a single differential data line 22 that includes a first bus line 24 and a second bus line 26 is depicted in FIG. 1. It should be noted that the SCSI bus 20 actually has several differential data lines that are terminated and controlled in the following described manner.

The first device 12 is coupled to a first end of the SCSI bus 20 and as depicted includes a first terminator 40, a LVD driver 80, and a bus controller circuit 90. The second device is coupled to a second end of the SCSI bus 20 and as depicted includes a second terminator 60, a LVD receiver 85, and a bus controller circuit 95. It should be noted that each LVD SCSI device coupled to the SCSI bus 20 has a LVD driver in order to transmit data and a LVD receiver in order to receive data. However, since only one terminator is coupled to each end of the SCSI bus 20, the SCSI devices that are not coupled to the ends of the SCSI bus need not include a terminator. Furthermore, even the SCSI devices at the ends of the SCSI bus 20 need not include a terminator if a separate terminating device is coupled to the ends of the SCSI bus 20.

The first terminator 40 is coupled to a first end of the differential data line 22. The first terminator 40 terminates the first end of the differential data line 22 in order to reduce signal reflection upon the differential data line 22. Furthermore, the first terminator 40 impresses a first differential biasing voltage on the first end of the differential data line 22. To this end, the first terminator 40 includes a first resistor 42, a first voltage source 44, a second voltage source 46, a second resistor 48, a third voltage source 50, a buffer 52, and a third resistor 54. The first resistor 42, the first voltage source 44, the second voltage source 46, and the second resistor 48 are respectively coupled in series between the first bus line 24 and the second bus line 26. Furthermore, the third voltage source 50, the buffer 52, and the third resistor 54 are respectively coupled in series between ground and a node 56 that is between the first voltage source 44 and the second voltage source 46.

The first resistor 42 and the second resistor 48 in combination match the impedance of the first bus line 24 and the second bus line 26 of the differential data line 22. In LVD SCSI, the first bus line 24 and the second bus line 26 each typically have a characteristic impedance of approximately 110 ohms. Therefore, in order to match the characteristic impedance of the first and second bus lines 24 and 26, the first resistor 42 and the second resistor 48 have in combination an impedance of approximately 110 ohms. Typically, the first resistor 42 and the second resistor 48 have substantially equal impedances of about 55 ohms apiece.

The buffer 52 is operable to help isolate the third voltage source 50 from the remainder of the first terminator 40 and may be implemented as a voltage follower circuit. In particular, the buffer 52 is operable to sink or source a substantially small amount of current due to differences between center voltages set by the first terminator 40 and the second terminator 60. As a result, a substantially small amount of current flows through the third resistor 54, thus causing the voltage level at the node 56 to be substantially equal to a third voltage produced by the third voltage source 50. Due to the node 56 being substantially equal to the third voltage produced by the third voltage source 50, the third voltage source 50 essentially sets the center voltage around which differential voltages are applied to the differential data line 22. For LVD SCSI, a typical third voltage produced by the third voltage source 50 is approximately 1.25 volts.

Assuming substantially no differential current is flowing through the first resistor 42 and the second resistor 48, the first voltage source 44 and the second voltage source 46 in combination impress the first differential biasing voltage upon the differential data line 22. In particular, the first voltage source 44 impresses a first voltage upon the first bus line 24 that is greater than the center voltage at node 56. Conversely, the second voltage source 46 impresses a second voltage upon the second bus line 26 that is less than the center voltage at node 56. The difference between the first voltage on the first bus line 24 and the second voltage on the second bus line 26 is the first differential biasing voltage supplied by the first terminator 40. In LVD SCSI, the first voltage source 44 and the second voltage source 46 are typically each 60 mV (millivolts) that in combination impress a first differential biasing voltage upon the differential data line 22 of about 120 mV.

The bus controller circuit 90 is coupled to an LVD receiver (not shown) of the first device 12 and the LVD driver 80. The bus controller circuit 90 is operable to process output signals from the LVD receiver (not shown) of the first device 12. Moreover, the bus controller circuit 90 is operable to generate control signals which cause the LVD driver 80 to transmit data across the differential data line 22. In controlling the operation of the LVD driver 80, the bus controller circuit 80 is further operable to determine whether the differential data line 22 has been at either a negative differential voltage state (e.g. −375 mV) for a predetermined time period or a positive differential voltage state (e.g. 367.5 mV) for the predetermined time period. As will be explained in more detail below, if the bus controller circuit 80 determines that the differential data line 22 has been at either the negative differential voltage state or the positive differential voltage state for the predetermined time period, then the bus controller circuit 80 generates a control signal which informs the LVD driver 80 that the LVD driver 80 will need to compensate for initial signal interference when driving the differential data line 22 from one differential voltage state to an opposite differential voltage state.

The bus controller circuit 90 is further operable to generate SCSI protocol control signals for transmission across the control lines of the SCSI bus 20 and to receive SCSI protocol control signals from the control lines of the SCSI bus 20. The bus controller circuit 90 is also operable to control an interface between the SCSI bus 20 and the first device 12. For example, if the first device 12 is a computer system, then the bus controller circuit 90 is operable to control transfer of data between the SCSI bus 20 and the computer system in which the bus controller circuit 90 resides. Likewise, if the first device 12 is a hard drive, then the bus controller circuit 90 is configured to control transfer of data between the SCSI bus cable 20 and the hard drive in which the bus controller circuit 90 resides.

The LVD driver 80 is coupled to the differential data line 22 and is operable to drive the differential data line 22 of the SCSI bus 20 in order to transfer data across the differential data line 22. In particular, the LVD driver 80 is operable to (i) drive the differential data line 22 to an asserted state in order to transfer a binary one across the differential data line 22, (ii) drive the differential data line 22 to a negated state in order to transfer a binary zero across the differential data line 22, and (iii) permit the first voltage sources 44 and 64 and the second voltage sources 46 and 66 of the first and second terminators 40 and 60 to drive the differential data line 22 to their respective differential biasing voltages during a quiescent period of the SCSI bus 20. Furthermore, the LVD driver 80 is implemented to draw substantially no current from the differential data line 22 during periods when the LVD driver 80 is not driving the differential data line 22.

To this end, the LVD driver 80 includes a first current driver 82 that is coupled to the first bus line 24 of the differential data line 22 and a second current driver 84 that is coupled to the second bus line 26 of the differential data line 22. The first current driver 82 includes a first programmable current source 82a and a second programmable current source 82b that in response to control signals received from the bus controller circuit 90 respectively generate and source currents upon said differential data line 22 in order to cause appropriate differential voltages to be impressed upon the differential data line 22. Similarly, the first current driver 84 includes a first programmable current source 84a and a second programmable current source 84b that in response to control signals received from the bus controller circuit 90 respectively generate and source currents upon the differential data line 22 in order to cause appropriate differential voltages to be impressed upon the differential data line 22.

The second terminator 60 is coupled to a second end of the differential data line 22. The second terminator 60 is operable to terminate the second end of the differential data line 22 in order to reduce signal reflection upon the differential data line 22. Furthermore, the second terminator 60 is operable to impress a second differential biasing voltage on the second end of the differential data line 22. To this end, the second terminator 60 includes a first resistor 62, a first voltage source 64, a second voltage source 66, a second resistor 68, a third voltage source 70, a buffer 72, and a third resistor 74. The first resistor 62, the first voltage source 64, the second voltage source 66, and the second resistor 68 are respectively coupled in series between the first bus line 24 and the second bus line 26. Furthermore, the third voltage source 70, the buffer 72, and the third resistor 74 are respectively coupled in series between ground and a node 76 that is between the first voltage source 64 and the second voltage source 66.

The first resistor 62 and the second resistor 68 in combination match the impedance of the first bus line 24 and the second bus line 26 of the differential data line 22. In LVD SCSI, the first bus line 24 and the second bus line 26 each typically have a characteristic impedance of approximately 110 ohms. Therefore, in order to match the characteristic impedance of the first and second bus lines 24 and 26, the first resistor 62 and the second resistor 68 have in combination an impedance of approximately 110 ohms. Typically, the first resistor 62 and the second resistor 68 have substantially equal impedances of about 55 ohms apiece.

The buffer 72 is operable to help isolate the third voltage source 70 from the remainder of the second terminator 60 and may be implemented as a voltage follower circuit. In particular, the buffer 72 is operable to sink or source a substantially small amount of current due to differences between center voltages set by the first terminator 40 and the second terminator 60. As a result, a substantially small amount of current flows through the third resistor 74, thus causing the voltage level at the node 76 to be substantially equal to a third voltage produced by the third voltage source 70. Due to the node 76 being substantially equal to the third voltage produced by the third voltage source 70, the third voltage source 70 essentially sets the center voltage around which differential voltages are applied to the differential data line 22. For LVD SCSI, the third voltage source 50 typically produces a third voltage of approximately 1.25 volts.

Assuming substantially no differential current is flowing through the first resistor 62 and the second resistor 68, the first voltage source 64 and the second voltage source 66 in combination impress the second differential biasing voltage upon the differential data line 22. In particular, the first voltage source 64 impresses a first voltage upon the first bus line 24 that is greater than the center voltage at node 76. Conversely, the second voltage source 66 impresses a second voltage upon the second bus line 26 that is less than the center voltage at node 76. The difference between the first voltage on the first bus line 24 and the second voltage on the second bus line 26 is the second differential biasing voltage supplied by the second terminator 60. In LVD SCSI, the first voltage source 64 and the second voltage source 66 are typically each 60 mV that in combination impress a second differential biasing voltage upon the differential data line 22 of about 120 mV.

The bus controller circuit 95 is coupled to the LVD receiver 85 and to a LVD driver (not shown) of the second device 14. The bus controller circuit 95 is operable to generate control signals which cause the LVD driver of the second device 14 to transmit data across the differential data line 22. The bus controller circuit 95 is also operable to process output signals received from the LVD receiver 85. Furthermore, the bus controller circuit 95 is operable to generate SCSI protocol control signals for transmission across the control lines of the SCSI bus 20 and to receive SCSI protocol control signals from the control lines of the SCSI bus 20. Moreover, the bus controller circuit 95 is also operable to control an interface between the SCSI bus 20 and the second device 14. For example, if the second device 14 is a computer system, then the bus controller circuit 95 is operable to control transfer of data between the SCSI bus 20 and the computer system in which the bus controller circuit 95 resides. Likewise, if the second device 14 is a hard drive, then the bus controller circuit 95 is configured to control transfer of data between the SCSI bus 20 and the hard drive in which the bus controller circuit 95 resides.

The LVD receiver 85 is coupled to the differential data line 22 of the SCSI bus 20. In general, the LVD receiver 85 is operable to generate an output signal that is representative of a differential voltage impressed on the differential data line 22. To this end, the LVD receiver 85 may be implemented as a differential amplifier 87 that includes a first input that is coupled to the first bus line 24 and a second input that is coupled to the second bus line 26. The differential amplifier 87 is then operable to generate an output signal that is representative of the voltage difference between the first bus line 24 and the second bus line 26. In particular, the differential amplifier 97 is operable to (i) generate an output signal having a low voltage (e.g. a $V_{ss}$ of 0 volts) when a −400 millivolt difference exists between the first bus line 24 and the second bus line 26, and (ii) a high voltage (e.g. a $V_{DD}$ of 3.3 volts) when a +400 millivolt difference exists between the first bus line 24 and the second bus line 26. Furthermore, the LVD receiver 85 draws substantially no current from the differential data line 22.

In operation, each differential data line of the SCSI bus 20 has three states: (1) an idle or quiescent state, (2) a negated state, and (3) an asserted state. In order to simplify the following discussion, it will be assumed that the components of the first and second terminators 40 and 60 are substantially matched. In particular, it will be assumed that (i) the first and second resistors 42, 48, 62, and 68 are each equal to 55 ohms; (ii) the first and second voltage sources 44, 46, 54 and 64 are each equal to 60 mV; (iii) the third voltage sources 50 and 70 are each equal to 1.25 volts; and (iv) the third resistors 54 and 74 are each equal to 150 ohms.

During initialization of the SCSI bus 20 (e.g. as part of system power up), the SCSI bus 20 enters the quiescent state. In the quiescent state, no SCSI device drives the differential data lines of the SCSI bus 20. In other words, the LVD drivers of the SCSI devices drive no current on the differential data lines of the SCSI bus 20. Furthermore, the LVD receivers of the SCSI devices draw substantially no current. As a result, any current generated through the differential data lines 22 of the SCSI bus 20 is due to the first and second terminators 40 and 60. However, since the first terminator 40 and the second terminator 60 have substantially matched components, the first terminator 40 and the second terminator 60 both impress substantially equal voltages upon the first bus line 24 and the second bus line 26. As a result, substantially no current flows through the first bus line 24 and the second bus line 26. Furthermore, as stated above, substantially no differential current flows through the third resistors 54 and 74. Accordingly, substantially no current flows through the differential data line 22, and the third voltage sources 50 and 70 respectively impress a center voltage of 1.25 volts on the nodes 56 and 76.

The first voltage sources 44 and 64 each then raise the center voltage at nodes 56 and 76 and impress 1.31 volts (1.25 volts+60 mV) on the ends of the first bus line 24. Conversely, the second voltage sources 46 and 66 lower the center voltage at nodes 56 and 76 and impress 1.19 volts (1.25 volts−60 mV) on the ends of the second bus line 26. As a result of the above, a differential biasing voltage of 120 mV (1.31 volts−1.19 volts) is impressed upon the differential data line 22. In response to the 120 millivolt differential biasing voltage, the LVD receiver 85 generates an output signal that is representative of the 120 millivolt differential biasing voltage. The bus controller circuit 95 then determines from this output signal that the SCSI bus 20 is in the quiescent state.

In order to transfer a binary one across the differential data line 22, the bus controller 90 causes the LVD driver 80 to drive the differential data line 22 to the asserted state. During the asserted state, the LVD driver 80 drives the differential data line 22 to a first differential voltage. To this end, the bus controller circuit 90 via at least one control signal causes the second programmable current source 82b to sink a 9 mA (milliamp) current from the first bus line 24 and the first programmable current source 84a to source a 9 mA current on the second bus line 26. Furthermore, since the LVD receiver 85 draws substantially no current from the differential data line 22, the current produced by the LVD driver 80 flows solely through the first and second terminators 40 and 60. Moreover, since the first terminator 40 and the second terminator 60 have substantially matched components, the first terminator 40 and the second terminator 60 will have substantially matched impedances, thus causing half of the sourced current (4.5 mA) to flow from the LVD driver 80 to the first terminator 40 and half of the sourced current (4.5 mA) to flow from the LVD driver 80 through the second terminator 60. Likewise, half of the sinked current (4.5 mA) flows from the first terminator 40 to the LVD driver 80 and half of the sinked current (4.5 mA) flows from the second terminator 60 to the LVD driver 80.

As stated above, substantially no differential current flows through the third resistors 54 and 74. Accordingly, the third voltage sources 50 and 70 respectively impress a center voltage of 1.25 volts on the nodes 56 and 76, and the LVD driver 80 causes a 4.5 mA current to flow through each of the first and a second resistors 42, 48, 62, and 68. The first voltage sources 44 and 64 each raise the center voltage at nodes 56 and 76; however, since the 4.5 mA current is flowing from the second bus line 26 to the first bus line 24, the voltages generated by the first resistors 42 and 62 have polarities that are opposite of the polarities of the first voltage sources 44 and 64. Accordingly, the first voltage sources 44 and 64 hinder the LVD driver 80 in impressing the first differential voltage on the differential data line 22. In particular, the voltage generated across the first resistors 42 and 62 lower the center voltage by 247.5 mV (4.5 mA×55 ohms) while the first voltage sources counteract the effect by 60 mV, thus resulting in a first voltage of 1.0625 (1.25 volts−247.5 mV+60 mV) being impressed on the first bus line 24. Conversely, the voltage generated across the second resistors 48 and 68 raises the center voltage by 247.5 mV (4.5 mA×55 ohms) while the second voltage sources 46 and 66 counteract the effect by 60 mV, thus resulting in a second voltage of 1.4375 volts (1.25 volts+247.5 mV−60 mV) being impressed on the second bus line 26. As a result of the above, the LVD driver 80 develops a first differential voltage of −375 mV (1.0625 volts−1.4375 volts) upon the differential data line 22. In response to the −375 millivolt differential voltage, the LVD receiver 85 generates an output signal that is representative of the −375 millivolt differential voltage. The bus controller circuit 95 then determines from this output signal that the differential data line 22 is in the asserted state.

In order to transfer a binary zero across the differential data line 22, the bus controller 90 causes the LVD driver 80 to drive the differential data line 22 to the negated state. During the negated state, the LVD driver 80 drives the differential data line 22 to a second differential voltage. To this end, the bus controller circuit 90 via at least one control signal causes the first programmable current source 82a to source a 4.5 mA current on the first bus line 24 and the second programmable current source 84b to sink a 4.5 mA current from the second bus line 26. Furthermore, since the LVD receiver 85 draws substantially no current from the differential data line 22, the current produced by the LVD driver 80 flows solely through the first and second terminators 40 and 60. Moreover, since the first terminator 40 and the second terminator 60 have substantially matched components, the first terminator 40 and the second terminator 60 have substantially matched impedances, thus causing half of the sourced current (2.25 mA) to flow from the LVD driver 80 to the first terminator 40 and half of the sourced current (2.25 mA) to flow from the LVD driver 80 to the second terminator 60. Likewise, half of the sinked current (2.25 mA) flows from the first terminator 40 to the LVD driver 80 and half of the sinked current (2.25 mA) flows from the second terminator 60 to the LVD driver 80.

As stated above, substantially no differential current flows through the third resistors 54 and 74. Accordingly, the third voltage sources 50 and 70 respectively impress a center voltage of 1.25 volts on the nodes 56 and 76, and the LVD driver 80 causes a 2.25 mA current to flow through each of the first and the second resistors 42, 48, 62, and 68. The first voltage sources 44 and 64 each raise the center voltage at nodes 56 and 76. Furthermore, since the 2.25 mA current flows from the first bus line 24 to the second bus line 26, the voltages generated across the first resistors 42 and 62 have polarities that are equal to the polarities of the first voltage sources 44 and 64. Accordingly, the first voltage sources 44 and 64 aid the LVD driver 80 in impressing the second differential voltage on the differential data line 22. In particular, the voltage generated across the first resistors 42 and 62 will raise the center voltage by 123.75 mV (2.25 mA×55 ohms), and the first voltage sources will aid the effect by 60 mV, thus resulting in a first voltage of 1.43375 volts (1.25 volts+123.75 mV+60 mV) impressed on the first bus line 24. Conversely, the voltage generated across the second resistors 48 and 68 lowers the center voltage by 123.75 mV (2.25 mA×55 ohms), and the second voltage sources 46 and 66 aid the effect by 60 mV, thus resulting in a second voltage of 1.06625 volts (1.25 volts−123.75 mV−60 mV) being impressed on the second bus line 26. As a result of the above, a second differential voltage of 367.5 mV (1.43375 volts−1.06625 volts) is impressed upon the differential data line 22. In response to the 367.5 millivolt differential voltage, the LVD receiver 85 generates an output signal that is representative of the 367.5 millivolt differential voltage. The bus controller circuit 95 then determines from this output signal that a binary one is being transferred on the differential data line 22.

From the above description of the LVD SCSI bus operation, it should be appreciated that LVD driver 80 essentially drives the differential data line 22 to the negated state and the negated state in order to transfer data bits across the differential data line 22. However, it should also be appreciated by those skilled in the art that a typical LVD driver also maintains the differential data line 22 at the last impressed state (i.e. asserted or negated) even if the LVD driver is not transferring data. By maintaining the differential data line 22 at the last impressed state, the LVD driver helps reduce switching noise upon the SCSI bus 20. Due to this behavior of typical LVD drivers, a receiving device 14 cannot determine from the mere state of the differential data line 22 whether data is being transferred across the differential data line 22. The receiving device 14 must also analysis SCSI controls signals of the SCSI bus in order to determine whether data is being transmitted on the differential data line 22.

Furthermore, as can be seen from the above description of the LVD SCSI bus operation, the LVD driver 80 is required to supply asymmetrical currents to the differential data line 22 in order to generate the substantially symmetrical differential voltages of the negated and asserted states. The asymmetrical current required of the above LVD driver 80 has been found to generate additional noise on the differential data line 22. In Frank Gasparik's U.S. application Ser. No. 09/001,094 entitled Adjustable Biasing Voltage for a Bus Line and Associated Method, there is disclosed method and apparatus which enable LVD drivers to drive differential data lines with symmetrical currents to obtain the symmetrical differential voltages of the negated and asserted states and reduce noise on the differential data bus. It should be appreciated that the initial signal interference (ISI) compensation of the present invention, which is described in detail below, may be used in conjunction with the method and apparatus disclosed in U.S. application Ser. No. 09/001,094, the disclosure of which is hereby incorporated by reference, to obtain highly reliable data transfers across a LVD SCSI bus at high transfer rates such as Fast40 and Fast 80.

Referring now to FIG. 2, the effect of initial signal interference (ISI) upon data transfers across the differential line 22 is illustrated. In particular, the upper graph illustrates the differential voltage of the differential data line 22 from the perspective of the sending device 12, and the lower graph illustrates the differential voltage of the differential data line 22 from the perspective of the receiving device 14. As illustrated in the upper graph, the differential data line 22 has been at approximately –400 mV (i.e. a first differential voltage state) for a time period prior to the 50 nanosecond mark. Then, the LVD driver 80 of the sending device 12 drives the differential data line 22 alternately between +400 mV and –400 mV until the 125 nanosecond mark in order to alternately transfer binary zeros and binary ones across the differential data line 22. After the 125 nanosecond mark, the LVD driver 80 of the sending device 12 maintains the differential data line 22 at approximately +400 mV (i.e. a second differential voltage state).

As shown in the lower graph, the LVD receiver 85 of the receiving device 14 receives a series of differential voltage pulses between the 150 nanosecond mark and 225 nanosecond mark as a result of the LVD driver 80 driving the differential data line 22 alternately between +400 mV and –400 mV. Moreover, as shown in the lower graph of FIG. 2, the first differential voltage pulse of the series of differential voltage pulses has a diminished differential voltage magnitude (e.g. 320 mV). Due to the diminished differential voltage magnitude of the first differential voltage pulse, the receiving device 14 may fail to interpret the first differential voltage pulse as a valid data transfer. If the receiving device 14 is able to detect the data loss associated with the first differential voltage pulse through the use of parity, checksums, or the like, then the receiving device 14 may request the data be retransmitted which decreases the overall efficiency and data throughput of the SCSI bus 20. Worse yet, if the receiving device 14 is unable to detect the associated data loss, unrecoverable data loss and/or data corruption may result from the diminished differential voltage magnitude of the first differential voltage pulse thus decreasing the overall reliability of the SCSI bus 20.

The ISI reduction of the differential voltage magnitude is dependent upon the differential data line 22 being precharged to a differential DC voltage. More specifically, the differential data line 22 after remaining at a differential voltage for a precharge time period stores an amount of differential electrical charge $\Delta Q$ that is dependent upon the overall capacitance $C_T$ of the differential data line 22 and the differential voltage $\Delta V$ applied to the differential data line 22. In particular, the differential electrical charge $\Delta Q$ stored by the differential data line 22 is equal to the capacitance $C_T$ of the differential data line 22 multiplied by the differential voltage $\Delta V$ at which the differential data line 22 as remained for a precharge time period. For example, the capacitance $C_T$ of a 28 AWG transmission line commonly used to implement the differential data lines of the LVD SCSI bus 20 is about 200 picoFarads (pF). If the differential data line 22 has been at the negated state of approximately 400 mV for a precharge time period, then the differential data line 22 would be precharged to a value of about $8 \times 10^{-11}$ Coulombs (i.e. $200 \times 10^{-9}$ Farads$\times$0.4 Volts). Similarly, if the differential data line 22 has been at the asserted differential voltage state of approximately –400 mV for a precharge time period, then the differential data line 22 would be precharged to a value of about $-8 \times 10^{-11}$ Coulombs (i.e. $200 \times 10^{-9}$ Farads$\times$–0.4 Volts).

When the LVD driver 80 drives the differential data line 22 from the first differential voltage state (e.g. negated state) to the second differential voltage state (e.g. asserted state) after the differential data line 22 has been at the first differential voltage state for a precharge time period, the LVD driver 80 must overcome the additional differential electrical charge $\Delta Q$ stored by the differential data line 22. The problem is that past LVD drivers drove the differential data line 22 with either currents having the same magnitude regardless of whether the differential data line 22 was precharged or voltages having the same magnitude regardless of whether the differential data line 22 was precharged. At slower transfer rates, the constant magnitude approach of the prior LVD drivers was able to eventually overcome the precharged state of the differential data line 22 and achieve the desired differential voltage upon the differential data line 22 within the data transfer period. However, at faster transfer rates, the constant magnitude approach of the prior LVD drivers was unable to overcome the precharged state of the differential data line 22 and achieve the desired differential voltage upon the differential data line 22 within the data transfer period.

The present invention overcomes this deficiency of prior LVD drivers by driving the differential data line 22 to a greater differential voltage after the differential data line 22 has been at an opposite differential voltage for a precharge time period. In particular, the LVD driver 80 of the sending device 12 drives the differential data line 22 with a current having a greater magnitude in order to overcome the additional electrical charge $\Delta Q$ stored by the differential data line 22 as a result of being at the opposite differential voltage for a precharge time period. More specifically, the LVD driver 80 drives the differential data line 22 to a first differential voltage with an output current $I_{OUT}$ (e.g. 9 mA) if the LVD driver 80 does not need to overcome an additional differential electrical charge $\Delta Q$ stored by the differential data line 22. The LVD driver 80, however, drives the differential data line 22 with the output current $I_{OUT}$ plus an additional current $\Delta I_{TOT}$ if the LVD driver 80 needs to overcome an additional differential electrical charge $\Delta Q$ stored by the differential data line 22. In particular, the additional current $\Delta I_{TOT}$ needed to overcome the stored differential electrical charge ΔQ within a data transfer time period t may be estimated based upon the following equation: $\Delta Q=(I_{OUT}+\Delta I_{TOT})*t$.

For example, if (i) the differential data line 22 has a stored differential electrical charge ΔQ of $8\times10^{-11}$ Coulombs, (ii) data is being transferred across the LVD SCSI bus 20 at a Fast40 transfer rate, and (iii) the LVD driver 80 typically drives the differential data line 22 to the negated state with an output current $I_{OUT}$ of 4.5 mA then the additional current $\Delta I_{TOT}$ needed by the LVD driver 80 is 1.9 mA (i.e. $8\times10^{-11}$ Coulombs divided by 12.5 nanoseconds minus 4.5 mA). Similarly, if (i) the differential data line 22 has a stored differential electrical charge ΔQ of $-8\times10^{-11}$ Coulombs, (ii) data is being transferred across the LVD SCSI bus 20 at a Fast40 transfer rate, and (iii) the LVD driver 80 typically drives the differential data line 22 to the asserted state with an output current $I_{OUT}$ of -9.0 mA, then the additional current $\Delta I_{TOT}$ needed by the LVD driver 80 is -1.9 mA (i.e. substantially the same magnitude as the additional current $\Delta I_{TOT}$ needed by the LVD driver 80 to drive the differential data line 22 to the negated state).

Referring now to FIG. 3, the effect of initial signal interference (ISI) compensation upon data transfers across the differential line 22 is illustrated. In particular, the upper graph illustrates the differential voltage of the differential data line 22 from the perspective of the sending device 12, and the lower graph illustrates the differential voltage of the differential data line 22 from the perspective of the receiving device 14. As illustrated in the upper graph, the differential data line 22 has been at approximately -400 mV (i.e. a first differential voltage state) for a time period prior to the 50 nanosecond mark. Then, the LVD driver 80 of the sending device 12 at the 50 nanosecond mark drives the differential data line 22 to a first differential voltage (e.g. +450 mV) having a first magnitude in order to transfer a binary zero across the differential data line 22. The LVD driver 80, from the 62.5 nanosecond mark to the 125 nanosecond mark, alternately drives the differential data line 22 between two differential voltages having magnitudes less than the first magnitude of the first differential voltage. In particular, the LVD driver 80 as depicted alternately drives the differential data line between -400 mV and +400 mV in order to alternately transfer binary ones and binary zeros across the differential data line 22. After the 125 nanosecond mark, the LVD driver 80 of the sending device 12 maintains the differential data line 22 at approximately +400 mV (i.e. a second differential voltage state).

As shown in the lower graph, the LVD receiver 85 of the receiving device 14 receives a series of differential voltage pulses between the 150 nanosecond mark and the 225 nanosecond mark as a result of the LVD driver 80 driving the differential data line 22 between the 50 nanosecond mark and the 125 nanosecond mark. Moreover, as shown in the lower graph of FIG. 3, the first differential voltage pulse of the series of differential voltage pulses has a voltage magnitude substantially equal to the voltage magnitudes of the other differential voltage pulses. In other words, unlike the first differential voltage pulse shown in FIG. 2, the first differential voltage pulse of FIG. 3 has a sufficient enough magnitude to enable the receiving device 14 to interpret the first differential voltage pulse as a valid data transfer. Accordingly, the larger differential voltage for the first data transfer after the differential data line 22 has been at an opposite differential voltage for a precharge time period results in the differential data line 22 attaining a proper differential voltage at the receiving device 14.

Shown in FIG. 4 is a schematic diagram of an exemplary programmable current source 142 suitable for implementing the first programmable current source 82a of the first current driver 82 and the first programmable current source 84a of the second current driver 82. It should be appreciated by those skilled in the art that the second programmable current sources 82b, 84b may be implemented in a similar manner with complementary transistors.

The exemplary programmable current source 142 includes a reference resistor $R_{REF}$, a reference P-channel metal oxide semiconductor field effect transistor (MOSFET) $P_{REF}$, an output MOSFET $P_{OUT}$, addition MOSFETs $P_0$, $P_1$, $P_2$, ... $P_N$, and switches $S_0$, $S_1$, $S_2$, ... $S_N$. The reference resistor $R_{REF}$ couples the gate and the drain of the reference MOSFET $P_{REF}$ to a low voltage source $V_{SS}$ such as ground. Furthermore, the source of the reference MOSFET $P_{REF}$ is coupled to a high voltage source $V_{DD}$ such as 3.3 volts. The reference resistor $R_{REF}$ controls the magnitude of a reference current $I_{REF}$ which flows through the reference MOSFET $P_{REF}$. In particular, the greater the resistance of the reference resistor $R_{REF}$ the smaller the magnitude of the reference current $I_{REF}$. The exact resistance of the reference resistor $R_{REF}$ is dependent upon the electrical characteristics of the reference MOSFET $P_{REF}$ and the desired magnitude of the reference current $I_{REF}$. In an exemplary embodiment, the resistance of the reference resistor $R_{REF}$ is set such that the reference current $I_{REF}$ is substantially equal to 10 μA (microamps).

The output MOSFET $P_{OUT}$ is generally operable to produce an output current $I_{OUT}$ suitable for driving the differential data line 22 when the differential data line 22 is not precharged due to being at a differential voltage for a precharge time period. For example, in implementing the first programmable current source 82a, the output MOSFET $P_{OUT}$ is generally operable to produce an output current $I_{OUT}$ of approximately 4.5 mA. Similarly, in implementing the first programmable current source 84a, the output MOSFET $P_{OUT}$ is generally operable to produce an output current $I_{OUT}$ of approximately 9.0 mA. To this end, the gate of the output MOSFETs $P_{OUT}$ is coupled to the gate of the reference MOSFET $P_{REF}$. Furthermore, the source and the substrate of the output MOSFET $P_{OUT}$ are coupled to the high voltage source $V_{DD}$. The source of the output MOSFET $P_{OUT}$ is coupled to an LVD driver output OUT. The electrical characteristics of the output MOSFET $P_{OUT}$ are selected in such a manner as to achieve the desired output current $I_{OUT}$ (e.g. 4.5 mA or 9.0 mA).

Each switch $S_0$, $S_1$, $S_2$, ... $S_N$ is generally operable to turn a respective additional MOSFET of the additional MOSFETs $P_0$, $P_1$, $P_2$, ... $P_N$ on or off based upon a control signal received from an ISI control register 150. To this end, each switch $S_0$, $S_1$, $S_2$, ... $S_N$ is coupled between a gate of a respective additional MOSFET $P_0$, $P_1$, $P_2$, ... $P_N$ and the gate of the reference MOSFET $P_{REF}$. Each switch $S_0$, $S_1$, $S_2$, ... $S_N$ in essence turns on a respective additional MOSFET by electrically coupling the gate of the respective additional MOSFET to the gate of the reference MOSFET $P_{REF}$, and turns off the respective additional MOSFET by electrically decoupling the gate of the respective additional MOSFET from the gate of the reference MOSFET $P_{REF}$ based upon the status of a control signal received from the ISI control register 150 of the bus controller 90.

Each additional MOSFET $P_0$, $P_1$, $P_2$, ... $P_N$ when turned on is generally operable to generate an additional current $\Delta I_0$, $\Delta I_1$, $\Delta I_2$, ... $\Delta I_N$ having a magnitude based upon the reference current $I_{REF}$. Moreover, each additional MOSFET $P_0$, $P_1$, $P_2$, ... $P_N$ when turned off is generally operable to generate an additional current $\Delta I_0$, $\Delta I_1$, $\Delta I_2$, ... $\Delta I_N$ having a magnitude of approximately zero. To this end, the gates of the additional MOSFETs $P_0$, $P_1$, $P_2$, $P_N$ are coupled to the gate of the reference MOSFET $P_{REF}$ via switches $S_0$, $S_1$, $S_2$, ... $S_N$. Furthermore, each source and each substrate of the additional MOSFETs $P_0$, $P_1$, $P_2$, ... $P_N$ is coupled to the high voltage source $V_{DD}$. Moreover, each drain of the additional MOSFETs $P_0$, $P_1$, $P_2$, ... $P_N$ is coupled to the LVD driver output OUT.

In an exemplary embodiment, each additional MOSFET $P_0$, $P_1$, $P_2$, ... $P_N$ is operable to generates an additional current $\Delta I_0$, $\Delta I_1$, $\Delta I_2$, ... $\Delta I_N$ that is a power of two larger than the reference current $I_{REF}$. In particular, the additional MOSFET $P_0$ is operable to generate an addition current $\Delta I_0$ equal to $2^0$ times the reference current $I_{REF}$, the additional MOSFET $P_1$ is operable to generate an addition current $\Delta I_1$ equal to $2^1$ times the reference current $I_{REF}$, the additional MOSFET $P_2$ is operable to generate an addition current $\Delta I_2$ equal to $2^2$ times the reference current $I_{REF}$, and the additional MOSFET $P_N$ is operable to generate an addition current $\Delta I_N$ equal to times the reference current $I_{REF}$. If the reference current $I_{REF}$ is equal to 10 $\mu$A and the programmable current source 142 includes eight additional MOSFETs $P_0$, $P_1$, $P_2$, ... $P_7$, then the programmable current source 142 is operable to generate a total additional current $\Delta I_{TOT}$ ranging between 0 to 2.55 mA with a 10 $\mu$A resolution.

The ISI control register 150 essentially sets the total additional current $\Delta I_{TOT}$ produced by the additional MOSFETs $P_0$, $P_1$, $P_2$, ... $P_N$. To this end, the ISI control register 150 is coupled to the switches $S_0$, $S_1$, $S_2$, ... $S_N$ and is operable to generate control signals to control the switches $S_0$, $S_1$, $S_2$, ... $S_N$. In particular, the ISI control register 150 in an exemplary embodiment is operable to store a binary word, and generate control signals based upon the binary word stored in ISI control register 150. More specifically, in one exemplary embodiment, the ISI control register 150 receives and stores a binary word of zeros and ones and generates control signals which activate the switches $S_0$, $S_1$, $S_2$, ... $S_N$ corresponding to 1's in the binary word and deactivates the switches $S_0$, $S_1$, $S_2$, ... $S_N$ corresponding to 0's in the binary word.

Shown in FIG. 5, there is illustrated a flowchart depicting the general operation of the LVD SCSI bus 20 from the perspective of a sending device 12. In particular, the operation of the sending SCSI device 12 begins with properly configuring the ISI compensation register 150 in step 502. Properly configuring the ISI compensation register 150 may be accomplished via several different techniques such as hardwiring the value of the ISI compensation register 150, manually configuring jumpers of the sending SCSI device 12, and loading the ISI compensation register 150 with an appropriate value via an initialization software routine of a SCSI device driver used to control the sending SCSI device 12. In an exemplary embodiment, the ISI compensation register 150 is configured such that the ISI compensation register 150 causes the first LVD driver 80 to appropriately source and sink an additional total current $\Delta I_{TOT}$ of approximately 6.5 mA. It should be appreciated that the appropriate additional total current $\Delta I_{TOT}$ is dependent upon several electrical characteristics of the LVD SCSI bus 20 and that proper configuration may include manual testing of the LVD SCSI bus operation to fine tune the configuration of the ISI compensation register 150 in order to obtain a suitable additional total current $\Delta I_{TOT}$.

As should be appreciated by those skilled in the art, the length of time required to precharge a cable such as the differential data line 22 is dependent upon a cable time constant $\tau_{cable}$ for the cable which may be calculated based upon the Elmore theorem. In general, the Elmore theorem states that the cable time constant $\tau_{cable}$ is equal to half the total capacitance $C_T$ of the cable times the total resistance $R_T$ of the cable. For a typically Fast40 LVD SCSI bus implementation, it has been found that a precharge time period between roughly 25 nanoseconds and 37.5 nanoseconds or about 2 to 3 data transfer periods is sufficient to precharge the differential data line 22 to a level requiring the LVD driver 80 to drive the differential data line 22 with additional current or voltage.

Accordingly, after configuring the ISI compensation register 150, a separate counter (not shown) of the bus controller 90 is initialized for each differential data line 22 of the LVD SCSI bus 20. The bus controller 90 utilizes the separate counters in order to separately track the length of time each respective differential data line 22 has been at the same differential voltage state. The separate counters may be implemented via several techniques such as software variables, up counters, down counters, or registers. In an exemplary embodiment, the separate counters are implemented with down counters which are loaded in step 504 with a value based upon the length of time required to precharge the respective differential data line 22.

In step 506, the bus controller 95 for each data transfer period determines whether the bus controller 95 will be transferring a data word across the LVD SCSI bus 20 during the current data transfer period. If the bus controller 95 determines that the bus controller 95 will be transferring a data word across the LVD SCSI bus 20, then the bus controller 95 proceeds to step 508; otherwise the bus controller 95 proceeds to step 520.

The bus controller 95 then in step 508 determines based upon the separate counter for each differential data line 22 whether any one of differential data lines has been at the same differential data for a precharge time period that is sufficient to require the LVD drivers 80 to drive the differential data lines 22 with additional current or voltage. If the bus controller 95 determines that none of the differential data lines 22 have been at the same differential voltage for the precharge time period, then the bus controller 95 proceeds to step 510. However, if the bus controller 95 determines that at least one of the differential data lines 22 has been at the same differential voltage state for the precharge time period, then the bus controller 90 proceeds to step 512.

In step 510, the bus controller 90 configures the LVD drivers 80 to drive the respective differential data lines with no additional current or voltage. To this end, the bus controller 90 in an exemplary embodiment masks the control signals generated by the ISI compensation register 150 from the LVD drivers 80 in order to configure the LVD drivers 80 to drive their respective differential data lines 22 with no additional current or voltage.

However, in step 512, the bus controller 90 configures the LVD drivers 80 associated with precharged differential data lines 22 to drive their respective differential data lines 22 with additional current or additional voltage if the respective differential data line 22 is to be driven to an opposite differential voltage state than the precharged differential voltage state. To this end, the bus controller 90 masks the control signals generated by the ISI compensation register 150 from (i) the LVD drivers 80 associated with non-precharged differential data lines 22 and (ii) the LVD drivers 80 associated with precharged differential data lines 22 which will not be driven to an opposite differential voltage state during the data transfer. As a result of the above masking the control signals from the LVD drivers 80, only the LVD drivers 80 associated with the precharged differential data lines 22 to be driven to an opposite differential voltage state will drive their respective differential data lines with an additional current or an additional voltage as indicated by the ISI control register 150.

After configuring the LVD drivers 80, the bus controller 90 in step 514 causes the data word to be transferred across the LVD SCSI bus 20. To this end, the bus controller 90 generates control signals which cause the LVD drivers 80 to drive their respective differential data lines 22 to the differential voltage state associated with the data bit of the data word to be transferred across the respective differential data line 22. More specifically, due to the configuring of the LVD drivers 80 in steps 510 and 512, the LVD drivers 80, associated with non-precharged differential data lines 22, drive their respective differential data lines 22 with no additional current or additional voltage. Moreover, the LVD drivers 80, associated with precharged differential data lines 22 not to be driven to an opposite differential voltage state, drive their respective differential data lines 22 with no additional current or additional voltage. Furthermore, the LVD drivers 80, associated with precharged differential data lines 22 to be driven to an opposite differential voltage state, drive their respective differential data lines 22 with additional current or additional voltage as indicated by the ISI control register 150.

If the bus controller 90 in step 506 determines that the bus controller 90 has no data to transfer for the data transfer period, the bus controller 90 in step 520 causes the LVD drivers 80 to maintain the current differential voltage state upon their respective differential data lines 22 if no other SCSI device on the LVD SCSI bus 20 will be transferring data across the LVD SCSI bus during the data transfer period. To this end, the bus controller 90 in an exemplary embodiment masks the control signals generated by the ISI compensation register 150 from the LVD drivers 80 in order to configure the LVD drivers 80 to drive their respective differential data lines 22 with no additional current or additional voltage. Moreover, the bus controller 90 further generates control signals which cause the LVD drivers 80 to continue to drive their respective differential data line 22 to the same differential voltage state has the LVD drivers 80 drove their respective differential data line 22 during the previous data transfer period.

In step 522, the bus controller 90 updates the separate counter for each differential data line 22 and return to step 506 in order to process the next data transfer period. For example, in an exemplary embodiment utilizing down counters, the bus controller 90 causes each down counter associated with a differential data lines 22 that is not at the same differential voltage state as the previous data transfer period to reload or reset to a value associated with the precharge period of time. Furthermore, in the exemplary embodiment, the bus controller 90 causes each down counter associated with a differential data line 22 that is at the same differential voltage state as the previous data transfer period to decrement the value of the down counter by one. In this manner, the bus controller 90 is operable to determine that a differential voltage line 22 has been at the same differential voltage state for the precharge time period if the value of the counter has a predetermined relationship to a threshold value (e.g. less than or equal to 0).

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected. For example, the invention has been described in reference to overdriving the differential data line 22 for the first data bit transfer following the differential data line 22 being at a differential voltage state for at least a precharge time period. However, at high transfer rates such as Fast40 and Fast80 the differential data line 22 may in fact need to be overdriven for the first few data bit transfers following the differential data line 22 being at a differential voltage state for at least a precharge time period.

What is claimed is:

1. A method of compensating for initial signal interference exhibited by a differential transmission line, comprising the steps of:

a) determining whether said differential transmission line has been at a first differential voltage state for at least a first predetermined time period;

b) transmitting a first data bit across said differential transmission line by driving said differential transmission line from said first differential voltage state to a second differential voltage state with a first current having a first magnitude if said step (a) determines that said differential transmission line has not been at said first differential voltage state for at least said first predetermined time period; and c) transmitting at least said first data bit upon said differential transmission line by driving said differential transmission line from said first differential voltage state to said second differential voltage state with a second current having a second magnitude that is larger than said first magnitude if said step (a) determines that said differential transmission line has been at said first differential voltage state for at least said first predetermined time period.

2. The method of claim 1, wherein step (a) further comprises the steps of:

maintaining for said differential transmission line, a line cycle count indicative of a number of successive transmission cycles that said differential transmission line has been at said first differential voltage; and determining that said differential transmission line has been at said first differential voltage for at least said first predetermined time period if said line cycle count has a predetermined relationship to a predetermined cycle count.

3. The method of claim 1, wherein step (a) further comprises the steps of:

maintaining for said differential transmission line, a line transfer count indicative of a number of successive data bit transfers at said first differential voltage; and determining that said differential transmission line has been at said first differential voltage for at least said first predetermined time period if said line transfer count has a predetermined relationship to a predetermined transfer count.

4. The method of claim 1, further comprising the steps of:

transmitting after step (c) second data bit across said differential transmission line by driving said differential transmission line to said second differential voltage state with a third current having a third magnitude substantially equal to said first magnitude.

5. The method of claim 1, wherein:

said first differential voltage state corresponds to a positive differential voltage, and said step (c) comprises the step of discharging said differential voltage line with said second current having said second magnitude.

6. The method of claim 1, wherein:

said first differential voltage state corresponds to a negative differential voltage, and said step (c) comprises the step of charging said differential voltage line with said second current having said second magnitude.

7. The method of claim 1, wherein step (c) comprises the steps of:

generating said second current such that said second magnitude of said second current is predetermined based upon capacitance of said differential transmission line, resistance of said differential transmission line, and a first differential voltage magnitude associated with said first differential voltage state.

8. The method of claim 1, wherein said step (c) comprises the step of:

generating said second differential voltage having said second magnitude by driving said differential transmission line with a first current having a first current magnitude that is predetermined based upon capacitance of said differential transmission line, resistance of said differential transmission line, and a first differential voltage magnitude associated with said first differential voltage state.

9. A method of compensating for initial signal interference exhibited by a differential transmission line, comprising the steps of:

a) determining whether said differential transmission line has been at a first differential voltage state for at least a first predetermined time period;

b) transmitting a first data bit across said differential transmission line by impressing a first differential voltage having a first magnitude upon said differential voltage line in order to drive said differential transmission line from said first differential voltage state to a second differential voltage state if said step (a) determines that said differential transmission line has not been at said first differential voltage state for at least said first predetermined time period; and c) transmitting said first data bit upon said differential transmission line by impressing upon said differential voltage line a second differential voltage having a second magnitude larger than said first magnitude in order to drive said differential transmission line from said first differential voltage state to a second differential voltage state if said step (a) determines that said differential transmission line has been at said first differential voltage state for at least said first predetermined time period.

10. The method of claim 9, wherein step (a) further comprises the steps of:

maintaining for said differential transmission line, a line cycle count indicative of a number of successive transmission cycles that said differential transmission line has been at said first differential voltage; and determining that said differential transmission line has been at said first differential voltage for at least said first predetermined time period if said line cycle count has a predetermined relationship to a predetermined cycle count.

11. The method of claim 9, wherein step (a) further comprises the steps of:

maintaining for said differential transmission line, a line transfer count indicative of a number of successive data bit transfers at said first differential voltage; and determining that said differential transmission line has been at said first differential voltage for at least said first predetermined time period if said line transfer count has a predetermined relationship to a predetermined transfer count.

12. The method of claim 9, further comprising the steps of:

transmitting after step (c) a second data bit across said differential transmission line by impressing upon said differential voltage line a third differential voltage having a third magnitude substantially equal to said first magnitude in order to drive said differential transmission line to said second differential voltage state.

13. The method of claim 9, wherein:

said first differential voltage state corresponds to a positive differential voltage, and said step (c) comprises the step of discharging said differential voltage line with said second differential voltage having said second magnitude.

14. The method of claim 9, wherein:

said first differential voltage state corresponds to a negative differential voltage, and said step (c) comprises the step of charging said differential voltage line with said second differential voltage having said second magnitude.

15. A differential bus controller that compensates for initial signal interface associated with data transfers across a differential bus comprising a plurality of differential bus lines, said differential bus controller comprising:

a controller coupled to said plurality of differential bus lines, said controller operable to (i) control data transfers across said differential bus, (ii) separately determine for each differential bus line whether said differential bus line has been at a first differential voltage state for at least a first predetermined time period, and (iii) generate a separate control signal for each differential bus line which indicates whether said differential bus line has been at said first differential voltage state for at least said first predetermined time period; and a plurality of differential drivers coupled to said plurality of differential bus lines, each differential driver of said plurality of differential drivers operable to (i) transmit a first data bit across said differential bus line by driving said differential voltage line from said first differential voltage state to a second differential voltage state with a first current having a first magnitude if said control signal generated by said controller for said respective differential bus line indicates that said respective differential bus line has not been at said first differential voltage state for at least said first predetermined time period, (ii) and transmit said first data bit across said differential bus line by driving said differential voltage line from said first differential voltage state to said second differential voltage state with a second current having a second magnitude that is greater than said first magnitude if said control signal generated by said controller for said respective differential bus line indicates that said respective differential bus line has been at said first differential voltage state for at least said first predetermined time period.

16. The bus controller of claim 15, further comprising a register operable to store a control word, wherein:

each differential driver of said plurality of differential drivers is operable to generate said second current such that said second magnitude of said second current is based upon said control word stored in said register.

17. The bus controller of claim 16, wherein:

said control word of said register is set to a value that is predetermined based upon capacitance of said differential bus lines, resistance of said differential bus lines, and a first differential voltage magnitude associated with said first differential voltage state.

18. The bus controller of claim 15, further comprising a plurality of line cycle counters, each line cycle counter of said plurality of line cycle counters operable to maintain a value indicative of a number of successive transmission cycles that a respective differential bus line of said plurality of bus lines has been at said first differential voltage, wherein:

said controller is further operable to separately determine for each differential bus line of said plurality of differential bus lines whether said differential bus line has been at said first differential voltage state for at least said first predetermined time period based upon said line cycle counter for said differential bus line.

19. The bus controller of claim 15, further comprising a plurality of line transfer counters, each line transfer counter of said plurality of line cycle counters operable to maintain a value indicative of a number of successive data bit transfers at said first differential voltage, wherein:

said controller is further operable to separately determine for each differential bus line of said plurality of differential bus lines whether said differential bus line has been at said first differential voltage state for at least said first predetermined time period based upon said line transfer counter for said differential bus line.

20. The bus controller of claim 15, wherein:

each differential driver of said plurality of differential drivers is further operable to transmit a second data bit across said differential bus line after transmitting said first data bit by driving said respective differential bus line to said second differential voltage state with a third current having a third magnitude substantially equal to said first magnitude.

* * * * *